United States Patent [19]
Krenz et al.

[11] Patent Number: 5,508,709
[45] Date of Patent: Apr. 16, 1996

[54] ANTENNA FOR AN ELECTRONIC APPARATUS

[75] Inventors: Eric L. Krenz, Crystal Lake; James P. Phillips, Lake in the Hills, both of Ill.

[73] Assignee: Motorola, Inc., Schaumburg, Ill.

[21] Appl. No.: 375,339

[22] Filed: Jan. 18, 1995

Related U.S. Application Data

[63] Continuation of Ser. No. 55,459, May 3, 1993, abandoned.

[51] Int. Cl.$^6$ ............................................. H01Q 1/24
[52] U.S. Cl. ..................... 343/702; 343/865; 343/856; 343/882; 455/89; 455/90
[58] Field of Search .................................................
  343/702,820,821,822,850,855,856,865,882,722,749,866;
  455/89,90,347,348; H01Q 1/24

[56] References Cited

U.S. PATENT DOCUMENTS

| | | | |
|---|---|---|---|
| 4,001,830 | 1/1977 | Ishimaru et al. | 343/702 |
| 4,313,119 | 1/1982 | Garay et al. | 343/702 |
| 4,471,493 | 9/1984 | Schober | 343/702 |
| 4,630,061 | 12/1986 | Hately | 343/749 |
| 4,644,366 | 2/1987 | Scholz | 343/702 |
| 4,651,312 | 3/1987 | Honma et al. | 343/702 |
| 4,862,183 | 8/1989 | Blaese | 343/715 |
| 5,014,346 | 5/1991 | Phillips et al. | 343/702 |
| 5,057,847 | 10/1991 | Vaisanen | 343/702 |
| 5,073,761 | 12/1991 | Waterman et al. | 333/24 C |
| 5,170,173 | 12/1992 | Krenz et al. | 343/702 |
| 5,337,061 | 8/1994 | Pye et al. | 343/702 |

FOREIGN PATENT DOCUMENTS

| | | |
|---|---|---|
| 0394714A3 | 10/1990 | European Pat. Off. . |
| 2679086 | 1/1993 | France . |

*Primary Examiner*—Hoang Anh Le
*Attorney, Agent, or Firm*—Randall S. Vaas

[57] ABSTRACT

An antenna for an electronic apparatus is located in a flip element of the apparatus housing. A transformer, having a winding in the flip element and a winding in the housing couples electromagnetic energy across the hinge while impedance matching and performing a balun function.

6 Claims, 2 Drawing Sheets

5,508,709

ANTENNA FOR AN ELECTRONIC APPARATUS

This is a continuation of application Ser. No. 08/055,459, filed May 3, 1993, and now abandoned.

BACKGROUND OF THE INVENTION

This invention relates generally to an antenna and an antenna coupling device for radio equipment and more particularly relates to an antenna structure mounted in a movable housing element and coupled to a portable radio transceiver.

Antennas for portable radio equipment pose particular problems in the areas of efficiency and reliability. Preferably, an antenna should be of a size which is related to the wavelength of operation of the radio and should be located in a position away from conducting or absorbing materials. An externally exposed antenna which may meet these criteria, however, is subject to wear and abuse which shorten the antenna's lifetime.

It has been shown that an antenna could be placed in a location interior to the housing of a portable radiotelephone; for example see U.S. Pat. Nos. 5,014,346 and 5,170,173 assigned to the assignee of the present invention. The antennas disclosed therein are located in a housing flip element, thereby realizing separation of the antenna from the remainder of the housing and protection for the antenna radiating/receiving elements. Coupling to/from the antenna is realized by capacitive or inductive (transformer) coupling located in the knuckles of the hinge. Other techniques of coupling via a rotating joint have been to use flexible spring wiper elements or thin coaxial cables to bridge hinged elements. Either of these techniques suffer problems: coaxial cables are bulky, mechanically noisy, and prone to fatigue failure while contact-type connectors are electrically noisy and prone to wear. Fixed coupling to antennas through such media as glass, which has become popular for mounting cellular radiotelephone antennas to vehicular window glass, does not suffer the problems associated with movement of the coupling elements. The teachings of such fixed coupling techniques are of limited value for the embodiment of the present invention.

Placing an antenna in the radio housing or in a flip element may require compromises in the antenna configuration. Compensating for these compromises may require additional circuitry which consumes more physical volume in the portable radio. Thus, it would be desirable to include an antenna in a protective radio housing element while minimizing volume and number of elements in a device which couples the antenna to the radio.

SUMMARY OF THE INVENTION

Accordingly to address these problems, the present invention encompasses an antenna having a balanced conductive electromagnetic energy radiating or receiving portion with a first impedance value and coupled to a transformer portion. The transformer portion has a predetermined value of inductive coupling and at least two windings movable relative to each other without substantial variation in the value of inductive coupling. The transformer portion matches the first impedance value to a second impedance value and converts to unbalanced the balanced radiating or receiving portion.

DESCRIPTION OF A PREFERRED EMBODIMENT

Figure 1:
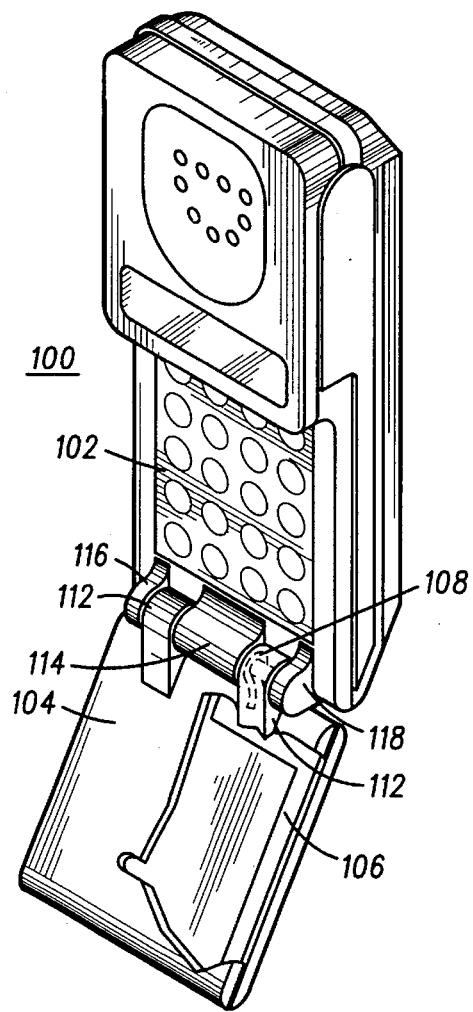
FIG. 1 is a perspective view of a portable radio transceiver which may employ the present invention.

An electronic apparatus which may advantageously utilize the present invention is a portable cellular radiotelephone 100 such as that shown in FIG. 1. Such a portable radiotelephone has user interface elements, such as a telephone dialing keypad 102, located on the front surface and which may be covered by a movable flip housing element 104 when not in use. Interior to the flip housing element 104, the antenna radiating and/or receiving elements 106 are disposed (shown in cutaway view in FIG. 1) out of harm's way. Such a location provides physical protection for the antenna elements while offering a separation from the remainder of the radio. The flip element 104, in the preferred embodiment, employs two hinge knuckles 112 and the radio housing employs one large central knuckle 114 and two supporting knuckles 116 and 118. (While only a single antenna is shown for radiotelephone 100, it should be realized that the antenna of the preferred embodiment may be used with other, conventional, antenna structures. A single, whip-style antenna may be mounted at the top of the portable radiotelephone, for example, and used to provide antenna diversity for the portable radiotelephone. In addition to the obvious space diversity nature of a two antenna approach, the antenna of the present invention also offers polarization diversity when used in conjunction with the aforementioned whip antenna.)

Also visible in cutaway in FIG. 1 is a coupling device 108 which is located, in two parts, in a knuckle of the hinge mechanically coupling the flip element 104 to the rest of the radio.

Figure 2:
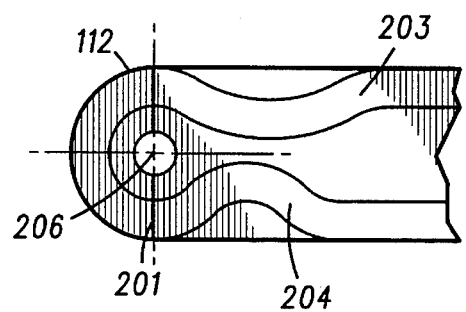
FIG. 2 is a view of the antenna-side transformer winding which may be employed in the present invention.
Figure 3:
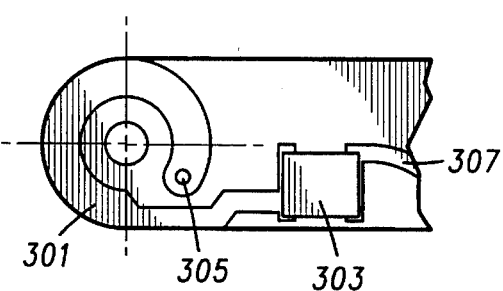
FIG. 3 is a view of the radio-side transformer winding which may be employed in the present invention.

The coupling device 108 is an inductively coupled transformer structure having one winding, or conductive loop, in the central knuckle 114 which is attached to the portable radiotelephone housing and second winding in one hinge knuckle 112 attached to the flip element portion 104. The winding 201 of the transformer coupling device 108 is located in the flip element hinge knuckle 112. Referring to FIG. 2, winding 201 is a thin monoplanar metal (conducting) loop having an outside diameter of 0.95 cm and a conductor width of 0.15 cm and is symmetrical about the axis of rotation 206 of the hinge. Winding 201 is a balanced winding and is coupled to both elements of the dipole antenna 106 via lines 203 and 204 to form an uninterrupted conductor. Referring to FIG. 3, the other winding 301 in the housing central knuckle 114 is a thin monoplanar metal (conducting) loop having an outside diameter of 0.95 cm and a conductor width of 0.15 cm. This winding 301 is coupled to the radio via a 1.8 pf capacitor 303 and line 307 and is grounded through via hole 305. This transformer winding, therefore, is an unbalanced winding and is maintained both coaxial with the axis 206 of winding 201 and directly opposite winding 201. A series capacitance has been found to be necessary to cancel the self inductance of the windings 201 and 301, since the transformer is not an ideal transformer. This capacitance will be discussed below.

By placing the centers of the two windings on the same axis, and by coaxially aligning this axis of symmetry with the axis of rotation around which the hinge knuckles pivot, a contactless coupling of electromagnetic energy is achieved. Other techniques of transferring electromagnetic energy through a hinge apparatus, mentioned above, either introduce noise via the moving contacts or suffer reliability problems due to mechanical fatigue of the cable bridging the hinge. The inductive coupling employed avoids each of these problems.

Figure 4:
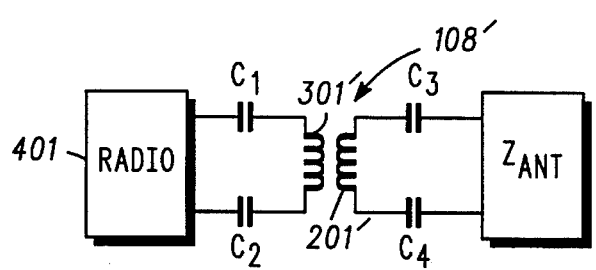
FIG. 4 is a schematic model of a tuned transformer coupling which may be employed in the present invention.

A schematic representation of the transformer coupling is shown in FIG. 4. For analysis, the schematic shows a balanced input winding 301' and a balanced output winding 201'. Four capacitors ($C_1$–$C_4$) are used to tune the transformer windings. It is a feature of the present invention that only one lumped element capacitor be used. The two capacitors $C_3$ and $C_4$ on the antenna-side winding are, in the preferred embodiment, eliminated by shortening each arm of the antenna from its nominal quarter wavelength to a somewhat shorter length to provide the necessary capacitive reactance. In operation, each of the elements of the antenna are shortened by 1.5 cm.

The two capacitors $C_1$ and $C_2$ on the radio-side winding 301' are, in the realization of the preferred embodiment, replaced by one capacitor (having the appropriate equivalent series capacitive reactance). Since the radio 401 input/output is an unbalanced circuit, this single capacitor for the unbalanced winding is well suited to couple to the radio 401. In the preferred embodiment, this single capacitor can be implemented as either a component capacitor, such as a chip capacitor, or as printed parallel plates on the substrate bearing the winding 301. The transformer coupling 108 is therefore able to perform the function of a balun: the transformer winding 201 which couples to the balanced antenna is balanced and the transformer winding 301 which couples to the radio is unbalanced.

Figure 5:
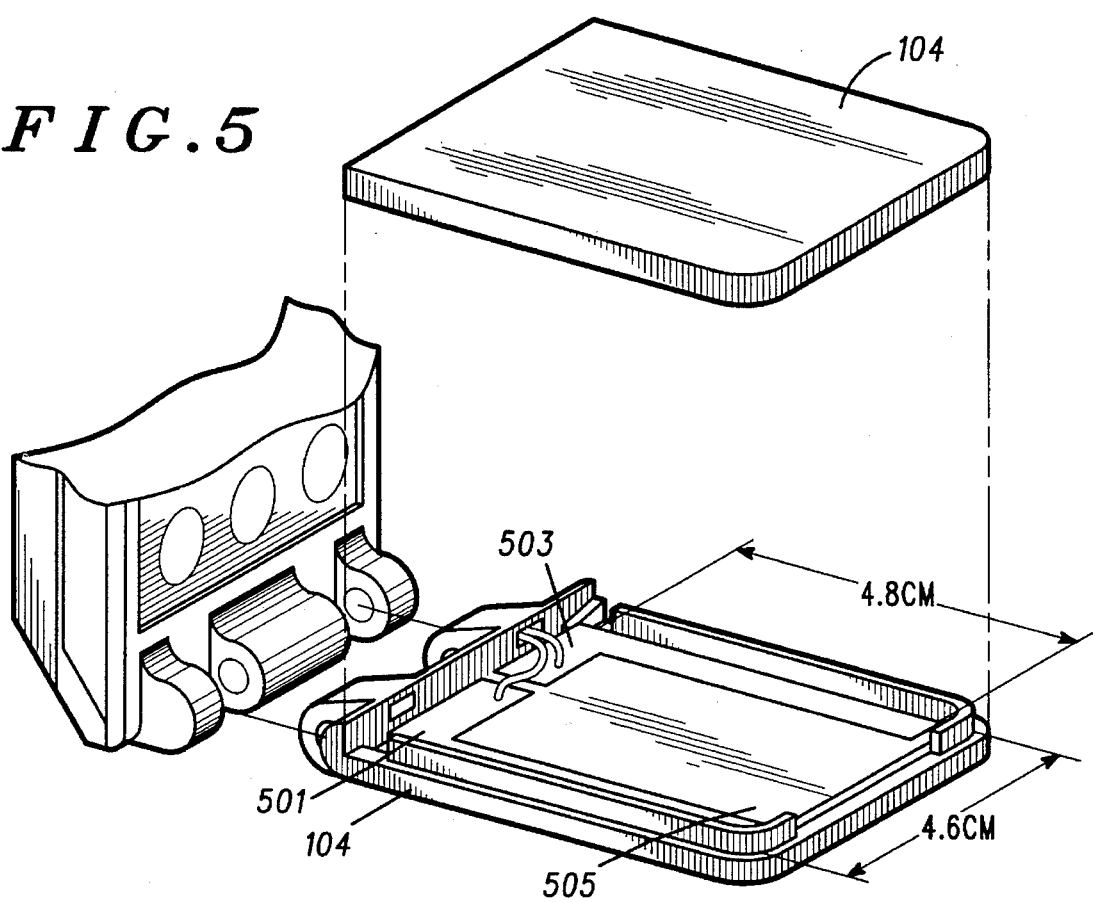
FIG. 5 is an exploded view of a portable radio transceiver flip element which may house an antenna useful in the present invention.

The antenna 106 of the preferred embodiment is a "C" shaped balanced dipole, as shown in FIG. 5. Each of the antenna elements 501 and 503 fit within the mechanical dimensions of the flip housing element 104 and are essentially symmetrical. In the preferred embodiment, where the band of radio operation spans the frequency range of from 865 MHz to 895 MHz (and has a nominal wavelength of 34 cm in free space), the antenna has the dimensions shown in FIG. 5 and the elements consist of a copper layer 0.0036 cm thick. As described earlier, these dimensions of each dipole arm are shorter than a quarter wavelength in this frequency band by 1.5 cm. This shortening of each arm creates a capacitive reactance as part of the antenna impedance. In the preferred embodiment, the 1.5 cm shortening creates a capacitive reactance equivalent to 1.8 pf, which is a reactance equal in magnitude to the magnitude of the self inductive reactance of the antenna-side transformer winding. The conductive elements 501 and 503 are disposed on a thin substrate 505 comprised of fiber glass, Teflon, plastic or other dielectric material.

This somewhat distorted dipole antenna has a reduced radiation resistance of approximately 15 ohms. For optimum energy transfer, an impedance transformation is necessary to match the antenna impedance to the typical 50 ohms of the radio. The transformer coupling 108 is also suited to accomplish this impedance transformation. Rather than space the windings further apart and suffer reduced transformer bandwidth due to a higher Q, the characteristics of the tuned coupling circuit are modified from a 15 ohm to 50 ohm transformer by simultaneously reducing the self inductance of each winding to approximately 18 nHy and the mutual inductance of the coupled pair to approximately 5 nHy. This modification of each winding preserves the bandwidth but increases the value of capacitance needed to the 1.8 pf value mentioned above.

Figure 6:
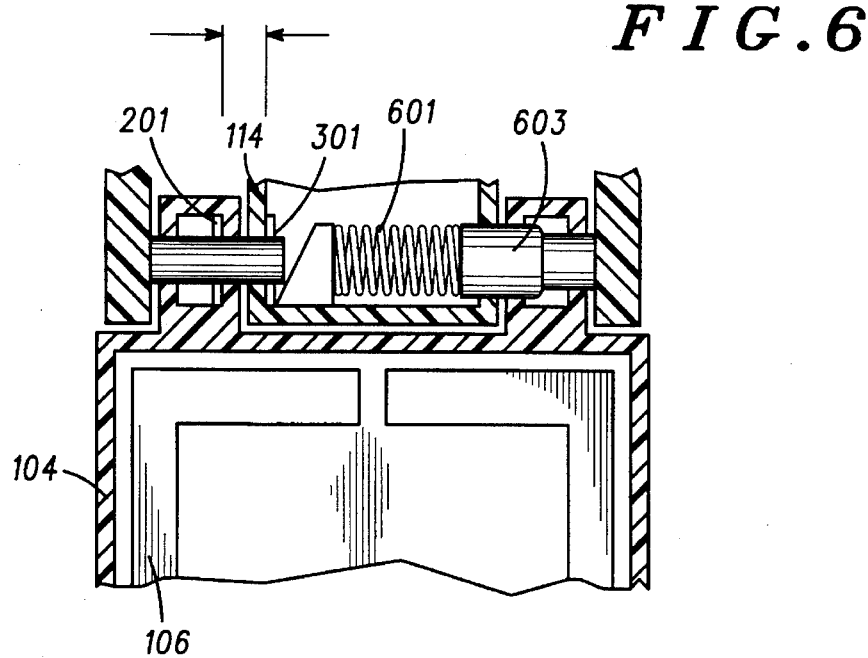
FIG. 6 is a cross sectional view of a flip element and hinge apparatus which may be used in the present invention.

The spacing between the windings is maintained at approximately 0.18 cm by the material of the portable housing knuckle and the material of the flip element knuckle. See FIG. 6 which shows a cross section of the radio housing hinge and the flip element 104. The radio-side winding 301 and the antenna-side winding 201 are, in the preferred embodiment, disposed on the plastic material of their respective knuckle. The space between the two knuckles is maintained at a minimum by a spring 601 which is mounted in the radio housing side of the hinge and which includes a detent 603 so located that spring pressure presses together the two knuckle surfaces that bear the windings.

Thus, the antenna and transformer coupler are able to create a reliable and efficient electromagnetic radiator in a portable radiotelephone flip element. The transformer coupler transfers electromagnetic energy across the flip element hinge without contacts or through-coaxial cable and couples a monoplanar antenna to a radio. The transformer coupler both matches the lower impedance of the antenna to the impedance of the radio, and is a balun between the balanced antenna and the unbalanced radio.

We claim:

1. An antenna apparatus comprising:
    a balanced conductive electromagnetic energy radiating or receiving portion having a first impedance value; and
    a transformer, coupled to said balanced conductive electromagnetic energy radiating or receiving portion, having a predetermined value of inductive coupling, having at least two windings movable relative to each other without substantial variation in said value of inductive coupling of said transformer, and including (a) an impedance transformation portion whereby said first impedance value is transformed to a second impedance value, and (b) a balun portion whereby said balanced conductive electromagnetic energy radiating or receiving portion is converted to unbalanced; one of said at least two windings connected to said balanced conductive electromagnetic energy radiating or receiving portion to form an uninterrupted conductor.

2. An antenna apparatus in accordance with claim 1 further comprising a capacitive reactance, coupled to one of said at least two transformer windings, having a magnitude equal to the magnitude of the self inductance reactance of said one of said at least two transformer windings.

3. An antenna apparatus in accordance with claim 1 wherein said conductive electromagnetic energy radiating or receiving portion further comprises an essentially "C" shaped monoplanar conductive strip.

4. An antenna apparatus in accordance with claim 1 wherein the antenna apparatus is to radiate or receive electromagnetic energy having a predetermined wavelength and wherein said radiating or receiving portion further comprises a conductive strip having a total electrical length equal to a predetermined amount less than a half of said predetermined wavelength.

5. An antenna apparatus in accordance with claim 1 wherein each of said at least two windings further comprise a monoplanar conductive loop having an axis and being disposed coaxially to said axis of another of said at least two windings.

6. A portable electronic apparatus employing antenna diversity including a radio and a movable housing element, the portable electronic apparatus comprising:

a balanced antenna for diversity having a first impedance value;

a hinge, having at least two portions which are rotatable relative to each other about an axis of rotation, one of said at least two portions connected to said movable housing and another of said at least two portions connected to the portable electronic apparatus; and a transformer, electrically coupled between the radio and said balanced antenna for diversity and having a first winding disposed in said one of said at least two hinge portions and a second winding disposed in said another of said at least two hinge portions, and including an impedance transformation portion for matching a second impedance value of the radio to said first impedance value, and a balun portion for converting said balanced antenna for diversity to unbalanced, said second winding coupling said balanced antenna for diversity to form a single unbroken conductor.

* * * * *